Lincoln & Pratt,
Animal Tether,
N° 62,761. Patented Mar. 12, 1867.
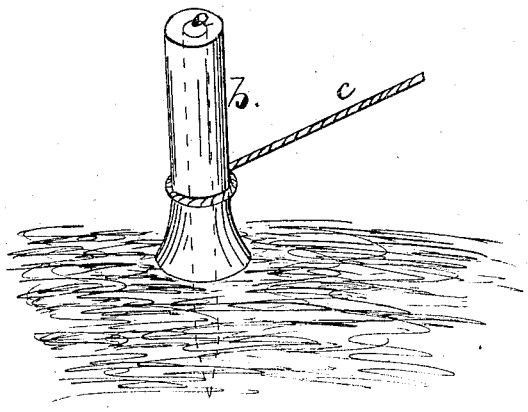
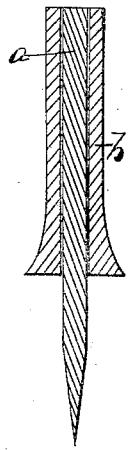
Witnesses
S. B. Kidder
M. W. Frothingham
Inventors:
Isaiah Lincoln & Aaron Pratt
By their Attys,
Crosby & Gould

United States Patent Office.

ISAIAH LINCOLN AND AARON PRATT, OF COHASSET, MASSACHUSETTS.

Letters Patent No. 62,761, dated March 12, 1867.

IMPROVEMENT IN ANIMAL TETHER.

The Schedule referred to in these Letters Patent and making part of the same.

TO ALL WHOM IT MAY CONCERN:

Be it known that we, ISAIAH LINCOLN and AARON PRATT, of Cohasset, in the county of Norfolk, and State of Massachusetts, have invented an Improved Animal Tether; and we do hereby declare that the following, taken in connection with the drawings which accompany and form part of this specification, is a description of our invention sufficient to enable those skilled in the art to practise it.

The advantages to be derived from tethering animals are nearly nullified by the dangers incurred by them arising from their entangling the tethering rope or chain upon its pivot. A tethering device has been produced, by means of which animals secured thereby can feed freely within a given radius without chance of fouling, winding, or entangling the tethering bond at or on the pivot. But said device is costly, and too cumbersome to be moved easily by one person from place to place, as the feed within the scope of a tethered animal becomes exhausted, and it is therefore of but little use to practical agriculturists.

By this invention, an animal-tethering device is produced, which is cheap, simple, easily removable from place to place, and it entirely prevents fouling or entangling of the tethering-bond on or around the pivot. Said invention consists in making the piece to which the tether-bond is secured, as a tube or sleeve-covering, and capable of freely rotating on a stake or pin driven into the ground.

A tethering device embodying this invention is seen in perspective in Figure 1, and in vertical central section in Figure 2.

$a$ is a plain round pin or stake, on which the tube or sleeve $b$ is so placed that it may be freely rotated with its base in contact with the surface of the ground. It is advisable to make the sleeve $b$ of metal or other suitable heavy material, and to give to the base thereof a flare like a trumpet-mouth, so as to prevent the tether-bond $c$, which is tied around the sleeve $b$, from coming into contact with the surface of the stake, by getting under the base of the sleeve.

It will be obvious that no movement of an animal tethered to the contrivance shown and described, can result in winding up the length of the tether-bond, because the sleeve will be rotated by any movement which would wind it around a fixed stake. A ring or short thimble slipped over a fixed stake, with the tether-bond secured to said ring or thimble, will not serve the purposes of the sleeve $b$, because the bond is not thereby prevented from coming into contact with the stake, and the winding thereupon is not therefore prevented.

We claim the device for tethering animals, substantially as described.

ISAIAH LINCOLN,
AARON PRATT.

Witnesses:
J. B. CROSBY,
F. GOULD.